W. WALKER.
CURTAIN LIGHT.
APPLICATION FILED JULY 11, 1921.
1,436,126.
Patented Nov. 21, 1922.
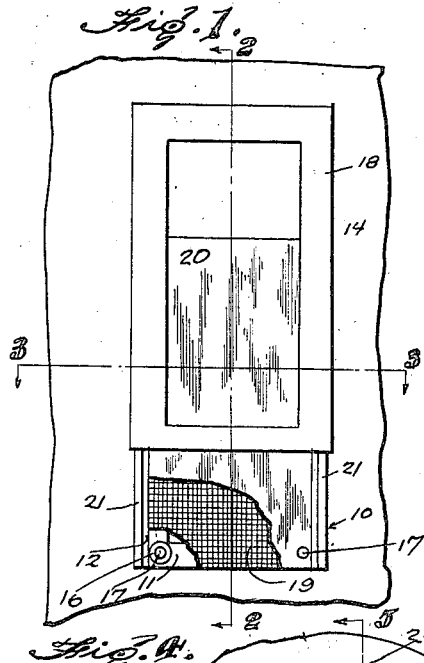
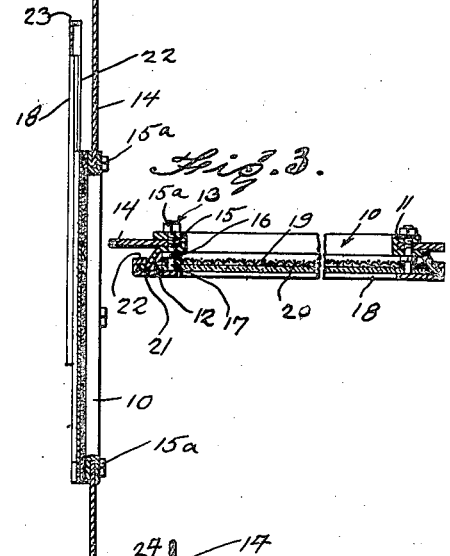
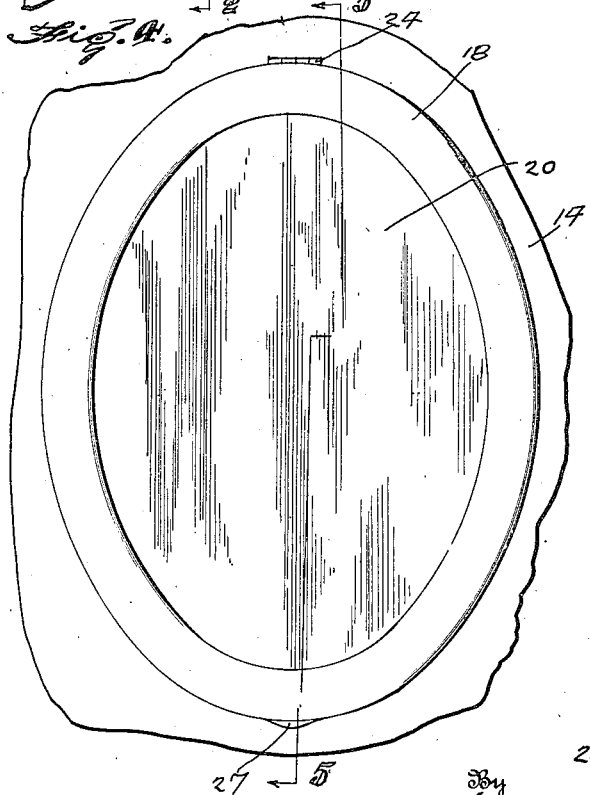
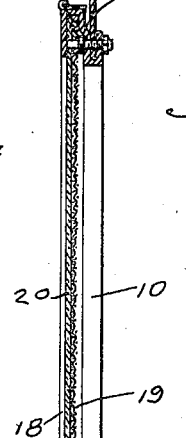
Inventor
William Walker.
By Watson E. Coleman
Attorney Patented Nov. 21, 1922.

1,436,126

UNITED STATES PATENT OFFICE.

WILLIAM WALKER, OF ROYAL, IOWA.

CURTAIN LIGHT.

Application filed July 11, 1921. Serial No. 483,927.

*To all whom it may concern:*

Be it known that I, WILLIAM WALKER, a citizen of the United States, residing at Royal, in the county of Clay and State of Iowa, have invented certain new and useful Improvements in Curtain Lights, of which the following is a specification, reference being had to the accompanying drawings.

This invention relates to improvements in protectors for celluloid curtain-windows and to a mounting therefor.

An important object of the invention is to provide a device of this character whereby a protecting screen may be readily placed in position to protect the celluloid curtain usually employed in automobile curtains, and from which the celluloid may be readily removed in order to provide ventilation when so desired.

A further object of the invention is to provide a device of this character which may be readily attached to automobile curtains without materially altering the present construction thereof.

A further object of the invention is to provide a light mounting for automobile curtains whereby the light may be readily removed and replaced if broken.

Other objects and advantages of the invention will become apparent throughout the course of the following description.

In the accompanying drawings wherein for the purpose of illustration are shown preferred embodiments of my invention, and wherein like reference characters designate like parts throughout:

Figure 1 is a rear elevation of my device, parts being broken away,

Figure 2 is a section on the line 2—2 of Figure 1,

Figure 3 is an enlarged section on the line 3—3 of Figure 1,

Figure 4 is a side elevation of a further modified form, and

Figure 5 is a section on the line 5—5 of Figure 4.

Referring now more particularly to the drawings, the numeral 10 indicates a frame which will be shaped to conform to the shape of the opening formed in the automobile curtain for the reception of the light. This frame is composed of a U-shaped strip of metal of the desired configuration, receiving between the arms 11 thereof the material 14 of the curtain, one of the arms of the frame being provided with an angular extension 12 for a purpose presently to appear.

The frame is secured to the material of the curtain by means of bolts 13, the threaded ends 15 of which project through the arms 11 of the frame and through the material 14 of the curtain and are secured in position by means of bolts 15ª. These bolts each embody a shoulder 16 abutting the outer arm of the frame or that arm provided with the projection 12, and are likewise provided with a longitudinal extension 17 of the same length as the extension 12, so that their outer ends are in a common plane with the flange formed by the angular extension.

The numeral 18 indicates a cover member or retainer which is likewise shaped to conform to the configuration of the light opening of the curtain and which is adapted to abut against the upper surface of the angular extension 12 and against the upper surface of the pins or extensions 17 of the bolts 13, so that it may retain in position upon the pins a screen 19 and a transparent element such as celluloid, 20. These elements are formed with the openings receiving the pins and are placed in position thereon and the cover member 18 moved into position so that it abuts the upper surface of the pins, preventing removal of the screen or transparency. It will be obvious that the screen will protect the transparency against breakage and likewise obvious that by removing the cover member the transparency 20 may be removed permitting ventilation through the light opening and through the screen 19, and at the same time preventing the entrance of insects.

The manner of applying the cover member 18 to the frame is in a great measure dependent upon the configuration of the frame. If the sides of the frame are parallel, the cover is preferably applied thereto by forming upon the angular extension 12 of the frame, an angular lip 21, and providing the sides of the cover member with a returned bent portion 22 adapted to slidably receive the flange 21, so that the cover member may be slid into position upon the frame. In this construction the upper end of the cover member is provided with an angular flange 23 abutting the material 14 of the curtain to prevent entrance of water at the upper end of the light mounting, the lower end of the cover member being left open to permit any water which may collect or gather upon the transparency to pass out without entering the interior of the car. In instances where opposed sides of the curtain are not parallel as, for example, in oval window lights, the cover member 18 will be pivotally connected to the frame 10, as indicated at 24, and will be provided at its edges with a flange 25 coacting with the flange 12 of the frame 10. In order to retain the cover member when hinged in closed position, any desired catch or retainer may be employed, such as for example a bead 26 formed upon the flange 12 of the frame 10 and coacting with a recess 27 formed on the flange 25 of the hinged cover member and engaging therewith with a spring action.

From the foregoing it will be obvious that I provide a frame in which the transparent element may be readily inserted and removed and in which the cover member serves to retain the transparent element and the protecting screen therefor, in position. I prefer to employ some fine mesh screen as ordinarily employed in making screen doors and window screens, so that the transparent element may be removed to provide ventilation and insects still be excluded from the interior of the car. It will likewise be obvious that the construction as hereinbefore set forth is capable of many changes and modifications without materially departing from the spirit of my invention, and I accordingly do not limit myself to the specific structure thereof except as hereinafter claimed.

What I claim is:

1. In a curtain light mounting, a frame, a cover member for said frame shiftable to applied and withdrawn positions, securing means for securing said frame to a curtain, said means embodying extensions and a light and a protector therefor removably mounted upon the extensions and held against removal therefrom by said cover member when in applied position.

2. In a curtain light mounting, the combination with a curtain having an opening formed therein, of a member defining the opening comprising a frame of U-shaped material receiving between the arms of the U the edges of the curtain at the sides of the opening, securing members extending through the curtain and through the arms of the U, extensions formed on said securing members, a covering sheet for the opening removable independently of said frame and having openings adapted to receive said extensions, and a cover member shiftable to engage said extensions to prevent the removal of said sheet.

3. In a curtain light mounting, the combination with a curtain having an opening formed therein, of a member defining the opening comprising a frame of U-shaped material receiving between the arms of the U the edges of the curtain at the sides of the opening, securing members extending through the curtain and through the arms of the U, extensions formed on said securing members, a covering sheet for the opening having openings adapted to receive said extensions, and a cover member shiftable to engage said extensions to prevent the removal of said sheet, said cover when in applied position having interlocking engagement with said frame.

4. In a curtain light mounting, a frame, a cover member for said frame shiftable to applied and withdrawn positions, securing means for securing said frame in position within an opening, said securing means embodying extensions, a light and a protector therefor removably mounted upon said extensions and independently removable therefrom, said cover member when in applied position abutting the ends of said extensions and preventing the removal of said light and protector therefrom.

In testimony whereof I hereunto affix my signature.

WILLIAM WALKER.